United States Patent
Tanaka et al.

(10) Patent No.: US 8,813,926 B2
(45) Date of Patent: Aug. 26, 2014

(54) IMPACT-ABSORBING STRUCTURE AND METHOD FOR PRODUCING THE SAME

(75) Inventors: Atsumi Tanaka, Aichi-ken (JP);
Hironori Maruyama, Aichi-ken (JP);
Masayuki Kanemasu, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 207 days.

(21) Appl. No.: 12/760,716

(22) Filed: Apr. 15, 2010

(65) Prior Publication Data

US 2010/0263976 A1 Oct. 21, 2010

(30) Foreign Application Priority Data

Apr. 20, 2009 (JP) ................. 2009-102091

(51) Int. Cl.
| | | |
|---|---|---|
| *B64C 1/00* | (2006.01) | |
| *B29C 70/88* | (2006.01) | |
| *B64C 1/06* | (2006.01) | |
| *B29C 70/86* | (2006.01) | |
| *B29C 70/08* | (2006.01) | |
| *B29L 31/30* | (2006.01) | |
| *B29K 105/06* | (2006.01) | |
| *B29K 305/00* | (2006.01) | |
| *B29K 101/10* | (2006.01) | |
| *B29C 65/50* | (2006.01) | |
| *B29K 309/04* | (2006.01) | |
| *B29C 65/00* | (2006.01) | |
| *B29K 69/00* | (2006.01) | |
| *B29L 31/60* | (2006.01) | |
| *B29K 309/08* | (2006.01) | |
| *B29K 77/00* | (2006.01) | |
| *B29K 307/00* | (2006.01) | |
| *B29K 307/02* | (2006.01) | |
| *B29K 101/12* | (2006.01) | |
| *B29K 75/00* | (2006.01) | |
| *B29K 707/04* | (2006.01) | |
| *B29K 63/00* | (2006.01) | |
| *B29K 67/00* | (2006.01) | |

(52) U.S. Cl.
CPC ............. *B64C 1/062* (2013.01); *Y02T 50/43* (2013.01); *B29C 70/88* (2013.01); *B29L 2031/3076* (2013.01); *B29K 2105/06* (2013.01); *B29K 2305/00* (2013.01); *Y02T 50/433* (2013.01); *B29K 2277/10* (2013.01); *B29K 2079/08* (2013.01); *B29K 2101/10* (2013.01); *B29C 65/5057* (2013.01); *B29K 2309/04* (2013.01); *B29K 2995/0089* (2013.01); *B29C 66/721* (2013.01); *B29K 2069/00* (2013.01); *B29L 2031/608* (2013.01); *B29K 2077/10* (2013.01); *B29C 70/865* (2013.01); *B29K 2309/08* (2013.01); *B29K 2077/00* (2013.01); *B29C 70/086* (2013.01); *B29K 2307/00* (2013.01); *B29K 2307/02* (2013.01); *B29K 2101/12* (2013.01); *B29K 2075/00* (2013.01); *B29K 2707/04* (2013.01); *B29K 2063/00* (2013.01); *B29K 2067/06* (2013.01); *B29K 2067/00* (2013.01)
USPC ............ 188/377; 188/371; 52/838; 244/119; 244/117 R

(58) Field of Classification Search
USPC ............... 188/371, 377, 376; 244/17.11, 119, 244/121, 129.1, 117 R, 120, 123.1, 123.13, 244/123.8, 124; 248/556, 557, 636, 638
See application file for complete search history.

(56) References Cited

U.S. PATENT DOCUMENTS

| | | | | |
|---|---|---|---|---|
| 4,531,695 | A * | 7/1985 | Swinfield | 244/119 |
| 4,593,870 | A * | 6/1986 | Cronkhite et al. | 244/117 R |
| 5,542,626 | A * | 8/1996 | Beuck et al. | 244/107 |
| 6,959,894 | B2 * | 11/2005 | Hayashi | 244/17.11 |
| 7,182,291 | B2 * | 2/2007 | Westre et al. | 244/119 |
| 8,047,465 | B2 * | 11/2011 | Payen | 244/17.11 |
| 2008/0023582 | A1 * | 1/2008 | Payen | 244/17.11 |
| 2008/0210817 | A1 * | 9/2008 | Gregg et al. | 244/119 |
| 2009/0206202 | A1 * | 8/2009 | Bolukbasi et al. | 244/121 |
| 2010/0219032 | A1 * | 9/2010 | Kanemasu et al. | 188/377 |

FOREIGN PATENT DOCUMENTS

| | | |
|---|---|---|
| EP | 1 813 527 | 8/2007 |
| JP | 07-217689 | 8/1995 |
| JP | 11-173356 | 6/1999 |
| JP | 11-173358 | 6/1999 |
| JP | 2001-354197 | 12/2001 |
| JP | 3486839 | 12/2001 |
| JP | 2004-182136 | 7/2004 |
| JP | 2005-273872 | 10/2005 |
| JP | 2006-341651 | 12/2006 |

OTHER PUBLICATIONS

European Search Report issued Mar. 22, 2013 in corresponding European Application No. 10 15 9744.

\* cited by examiner

*Primary Examiner* — Thomas Irvin

(74) *Attorney, Agent, or Firm* — Wenderoth, Lind & Ponack, L.L.P.

(57) ABSTRACT

An object is to provide an impact-absorbing structure superior in impact-absorbing capacity. An impact-absorbing structure includes a pair of flat, plate-like face plates arranged to oppose each other with a predetermined distance therebetween; a core member arranged between the face plates and fixed to the face plates; and a composite-material tube arranged between the face plates, at the core member side, the impact-absorbing member extending in one direction and fracturing progressively due to an impact compression force acting in the one direction. The composite-material tube is fixed to the face plates at one portion constituting a bonded region and is allowed to move relative to the face plates at a remaining portion constituting a non-bonded region.

13 Claims, 5 Drawing Sheets

IMPACT-ABSORBING STRUCTURE AND METHOD FOR PRODUCING THE SAME

BACKGROUND OF THE INVENTION

1. Field of the Invention

The present invention relates to an impact-absorbing structure suitable for use as the structure of an aviation vehicle, such as an aircraft or a car, and to a method for producing the same.

This application is based on Japanese Patent Application No. 2009-102091, the content of which is incorporated herein by reference.

2. Description of Related Art

Impact-absorbing structures are used as the structures of traveling bodies, such as aircraft (for example, helicopters, which are rotary-wing aircraft) and cars, to absorb impact in a collision. For example, for helicopters, which are rotary-wing aircraft, an underfloor structure having an impact-absorbing structure has been proposed to assure passenger safety during an forced landing.

As shown in FIG. 7, a web having a pair of face plates 101 opposed to each other with core members 103 and composite-material tubes 105 therebetween. When an impact compression load is applied to the web, fracture propagates in the axial direction of the composite-material tubes 105, whereby the impact energy is absorbed. Furthermore, a plurality of openings are provided or the interlaminar bonding of the composite material is weakened at the peripheral walls at one end of the composite-material tubes disclosed in the aforementioned citation to reduce the failure strength at one end. This accelerates initial failure at this end, reducing an excessive initial reaction force generated when an impact is applied.

However, in the web of FIG. 7, which is generally referred to as a "sandwich panel", the face plates 101 and the core members 103 are bonded by an adhesive. Therefore, the composite-material tubes 105 are also entirely fixed to the face plates 101 by an adhesive, together with the core members 103.

If the composite-material tubes 105 are entirely fixed to the face plates 101 as in this case, the composite-material tubes 105 are restrained by the face plates 101 when an impact force is applied. As a result, the composite-material tubes 105 fracture subsequent to the failure of the existing structure, such as the face plates, whereby the impact-energy absorption capacity is decreased. Furthermore, even if progressive failure occurs, because the entirety is fixed to the face plates 101, many of the fragments of the fractured impact-absorbing member enter the tubes. This results in a problem in that the effective length of the impact-absorbing member for absorbing the impact energy is reduced.

BRIEF SUMMARY OF THE INVENTION

The present invention has been made in view of the above-described circumstances, and an object thereof is to provide an impact-absorbing structure having a high impact-absorbing capacity and a method for producing the same To solve the above-described problems, an impact-absorbing structure and a method for producing the same of the present invention employ the following solutions.

That is, an impact-absorbing structure according to an aspect of the present invention comprises a pair of flat, plate-like face plates arranged to oppose each other with a predetermined distance therebetween; a core member arranged between the face plates and fixed to the face plates; and an impact-absorbing member arranged between the face plates, at the core member side, the impact-absorbing member extending in one direction and fracturing progressively due to an impact compression force acting in the one direction. The impact-absorbing member is fixed to the face plates at one portion and is allowed to move relative to the face plates at a remaining portion.

When an impact compression force is applied to the impact-absorbing structure, the impact compression force is transmitted to the impact-absorbing member. Due to this impact compression force, progressive failure propagates in the impact-absorbing member. At this time, because one portion of the impact-absorbing member is fixed to the face plates and the remaining portion is capable of movement relative to the face plates, the progressive failure of the impact-absorbing member propagates without being impeded by the face plates. Thus, because the remaining portion capable of relative movement allows the impact-absorbing member to fracture progressively, progressive failure with a large displacement occurs. Thus, the impact energy is effectively absorbed.

The one portion where the impact-absorbing member is fixed has a length of, for example, about 15 to 30% of the overall length. Preferably, the one portion where the impact-absorbing member is fixed is provided at an end of the impact-absorbing member. More preferably, in order for the progressive failure to start in the vicinity of the position subjected to an impact compression force, the one portion to be fixed is provided at the end opposite to the end subjected to the impact compression force. For example, when the impact-absorbing structure is used as the outer wall of an aviation vehicle, the one portion to be fixed is preferably provided on the inner side that constitutes the inside of the aviation vehicle.

In the above-described impact-absorbing structure, the impact-absorbing member is tubular with the axis extending in the one direction.

The tubular shape can allow progressive failure to appropriately propagate without causing buckling failure in which a failure at one site leads to overall failure. Although the preferred cross section of the tube shape is rectangular, it may be another shape, for example, a circular shape or a polygonal shape having five or more sides. As long as the shape allows progressive failure to occur without causing buckling failure, the cross section may be partially cut out (for example, C-shaped), and the cross section is not limited to an endless shape.

In the case where the impact-absorbing member is tubular, the impact-absorbing member fractures and the fragments enter the tube. The fragments accumulated in the tube clog the tube, increasing the rigidity, which inhibits compressive deformation of the impact-absorbing member in this region. In other words, the region where the fragments enter the tube and inhibit the compressive deformation does not contribute to the progressive failure. Therefore, the one portion where the impact-absorbing member is fixed to the face plates is preferably provided in a region where the fragments enter the inside and inhibit the compressive deformation when failure occurs (a region not contributing to the progressive failure).

In the above-described impact-absorbing structure, the impact-absorbing member is formed of a composite material consisting of a resin and reinforcing fibers.

By using a composite material consisting of a resin and reinforcing fibers as the impact-absorbing member, the weight can be reduced.

Preferably, carbon-fiber reinforced plastic (CFRP) is used as the composite material.

A thermosetting resin such as epoxy resin, unsaturated polyester resin, phenolic resin, polyimide resin, or polyurethane resin; or a thermoplastic resin such as polyamide, polyethylene terephthalate, polyester, or polycarbonate is used as the resin constituting the composite material, according to the necessity.

Preferably, carbon fibers are used as the reinforcing fibers constituting the composite material. Besides carbon fibers, glass fibers, aromatic polyamide fibers (aramid fibers), alumina fibers, silicon carbide fibers, boron fibers, or the like may be used.

In the above-described impact-absorbing structure, a release agent that prevents the impact-absorbing member from being bonded to the face plates is provided between the remaining portion of the impact-absorbing member and the face plates.

By using the release agent that prevents the impact-absorbing member from being bonded to the face plates, relative movement between the impact-absorbing member and the face plates can be easily achieved.

For example, an FEP (tetrafluoroethylene-hexafluoropropylene copolymer (4.6fluoride)) film may be used as the release agents.

The release agent is preferably provided between the impact-absorbing member and the core member to further ensure the relative movement.

In the above-described impact-absorbing structure, one of the pair of face plates is provided so as to expose one end of the remaining portion of the impact-absorbing member.

By providing one of the pair of face plates so as to expose one end of the remaining portion of the impact-absorbing member in order not to close the space where the impact-absorbing member is disposed, the face plates are prevented from inhibiting the progressive failure of the impact-absorbing member.

A method for producing a impact-absorbing structure according to an aspect of the present invention, the structure including a pair of flat, plate-like face plates arranged to oppose each other with a predetermined distance therebetween; a core member arranged between the face plates and fixed to the face plates; and a impact-absorbing member arranged between the face plates, at the core member side, the impact-absorbing member extending in one direction and fracturing progressively due to an impact compression force acting in the one direction, includes fixing one portion of the impact-absorbing member to the face plates with an adhesive; and arranging a release agent, which prevents the impact-absorbing member from being bonded to the face plates, between a remaining portion of the impact-absorbing member and the face plates.

Because the adhesive is used at one portion of the impact-absorbing member and the release agent is used at the remaining portion of the impact-absorbing member, it is possible to easily produce the impact-absorbing member with one portion fixed to the face plates and the remaining portion capable of movement relative to the face plates.

In the above-described impact-absorbing structure, because the remaining portion of the impact-absorbing member is capable of movement relative to the face plates, the progressive failure of the impact-absorbing member propagates without being impeded by the face plates. Thus, progressive failure with a large displacement occurs, whereby the impact energy can be effectively absorbed.

In the method for producing an impact-absorbing structure of the present invention, the adhesive is used at the one portion of the impact-absorbing member and the release agent is used at the remaining portion of the impact-absorbing member. Thus, it is possible to easily produce the impact-absorbing member with one portion fixed to the face plates and the remaining portion capable of movement relative to the face plates.

DETAILED DESCRIPTION OF THE INVENTION

An embodiment of the present invention will be described below with reference to the drawings.

Figure 1:
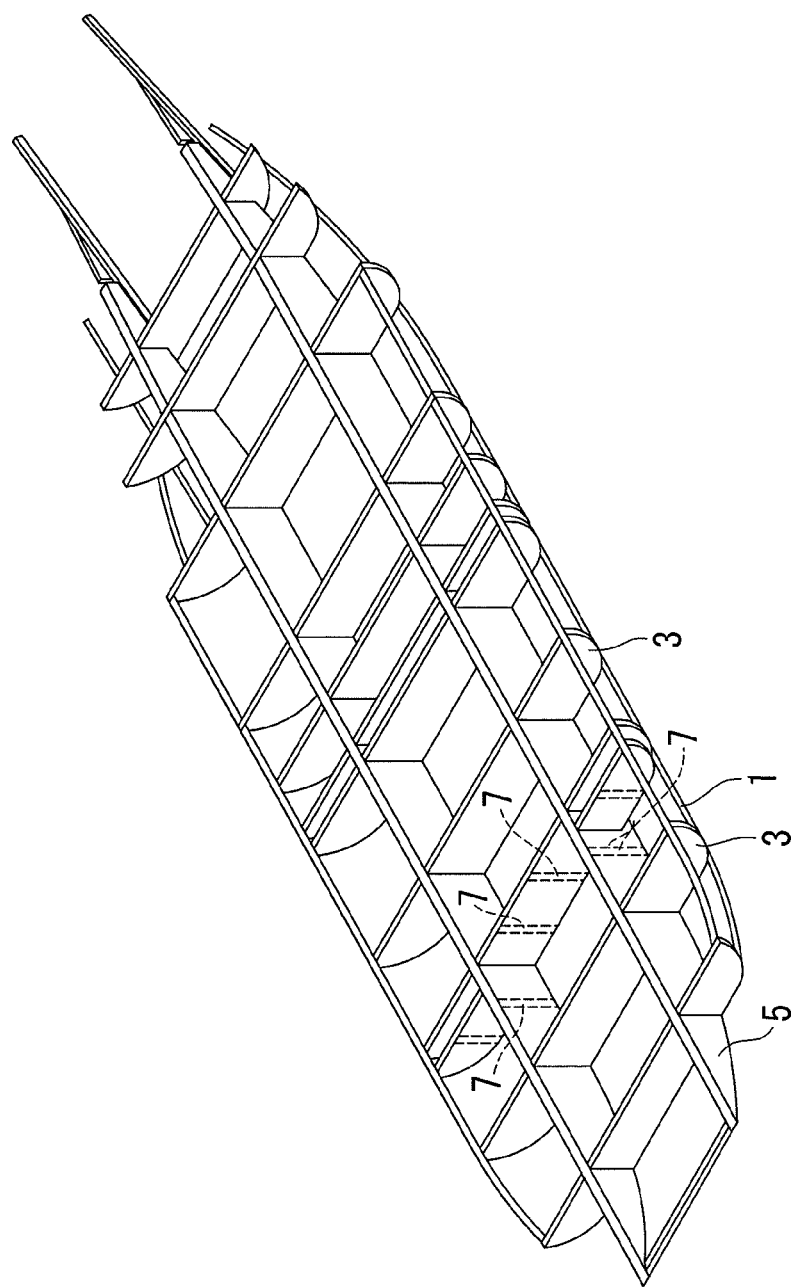
FIG. 1 is a perspective view showing an underfloor structure of a helicopter according to an embodiment of the present invention.

FIG. 1 shows a perspective view of an underfloor structure of a helicopter that employs an impact-absorbing structure of the present invention.

As shown in the figure, the underfloor structure is configured such that a plurality of frames 3 and a plurality of beams 5 are fixed to an underfloor outer board 1 that constitutes the bottom surface.

The frames 3 extending in the width direction are arranged in parallel at predetermined intervals. The beams 5 extending in the longitudinal direction, substantially perpendicular to the frames 3, are arranged in parallel at predetermined intervals.

The frames 3 and the beams 5 constitute the impact-absorbing structure. More specifically, composite-material tubes (impact-absorbing members) 7 are provided so as to stand upright from the underfloor outer board 1, at positions indicated by broken lines in the figure. The composite-material tubes 7 are provided at similar positions also on the other frames 3 and the beams 5 where no composite-material tubes 7 are illustrated. Note that the positions of the composite-material tubes 7 shown in the figure are merely examples, and the composite-material tubes 7 are provided at appropriate positions in the frames 3 and the beams 5.

Figure 2:
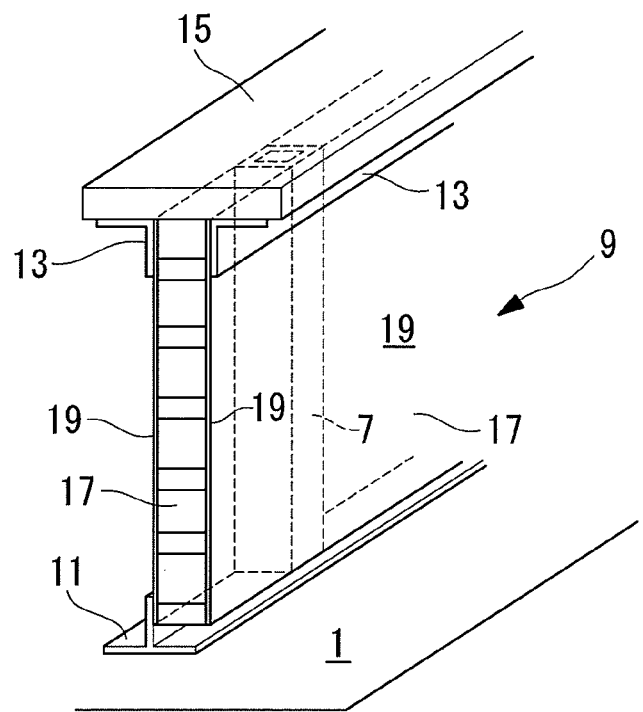
FIG. 2 is a partial sectional perspective view of a impact-absorbing structure according to an embodiment of the present invention.

FIG. 2 shows a partial sectional perspective view of the frame 3 or the beam 5 in FIG. 1, serving as the impact-absorbing structure.

As shown in the figure, an upright wall portion, which constitutes the main part of the frame 3 or the beam 5, is a sandwich panel 9. The lower end of the sandwich panel 9 is supported from one side by a T-shaped rail 11 having a T-shaped cross section and is fixed to the underfloor outer board 1 on the lower side. The upper end of the sandwich panel 9 is sandwiched from both sides between L-shaped rails 13 having an L-shaped cross section and is fixed to an upper structural member 15 on the upper side.

Instead of the T-shaped rail 11 for fixing the lower end of the sandwich panel 9, an L-shaped rail having an L-shaped cross section may be used.

The sandwich panel 9 is configured such that planar core members 17 and the composite-material tubes 7 are arranged next to each other and are sandwiched from both sides between the face plates 19 so as to form a wall. That is, the composite-material tubes 7 are arranged between the adjoining core members 17 in the lateral direction perpendicular to the upright direction.

The face plates 19 are thin plates and mainly provide the strength of the sandwich panel 9. Although various materials, including composite material, resin, and metal, may be used for the face plates 19, carbon-fiber reinforced plastic (CFRP), for example, is preferably used.

From the standpoint of assuring strength and reducing weight, the core members 17 preferably have a honeycomb structure. Although various materials, including composite material, resin, and metal, may be used for the core members 17, aromatic polyamide (aramid), for example, is preferably used.

The composite-material tubes 7 are arranged with the axes thereof extending in the upright direction of the sandwich panel 9. In other words, they are arranged with the axes thereof extending in a direction of compression generated when an impact force is applied from the underfloor outer board 1.

The composite-material tubes 7 are tubular with the axes thereof extending in a direction of compression generated by the impact force (one direction). Although the preferred cross section of the tube shape is rectangular, it may be another shape, for example, a circular shape or a polygonal shape having five or more sides.

The composite-material tubes 7 are formed of a composite material consisting of a resin and reinforcing fibers; a carbon-fiber reinforced plastic (CFRP) is preferably used.

A thermosetting resin such as epoxy resin, unsaturated polyester resin, phenolic resin, polyimide resin, or polyurethane resin; or a thermoplastic resin such as polyamide, polyethylene terephthalate, polyester, or polycarbonate is used as the resin constituting the composite material, according to the purpose.

Preferably, carbon fibers are used as the reinforcing fibers constituting the composite material. Besides carbon fibers, glass fibers, aromatic polyamide fibers (aramid fibers), alumina fibers, silicon carbide fibers, boron fibers, or the like may be used.

Figure 3:
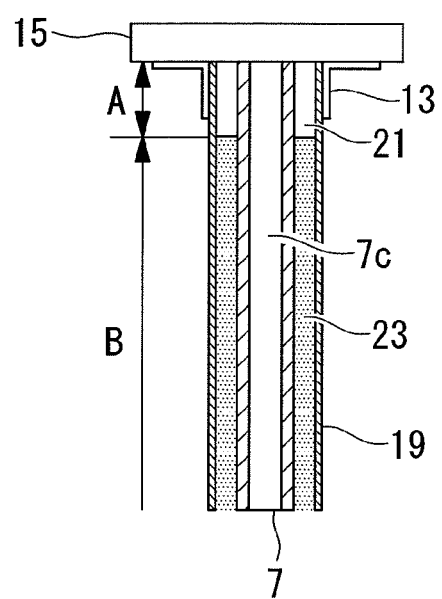
FIG. 3 is a longitudinal sectional view showing a relevant part at the upper end of the impact-absorbing structure in FIG. 2.

FIG. 3 shows a longitudinal sectional view of the upper end of the sandwich panel 9 and the vicinity thereof. The figure shows a longitudinal sectional view taken at the position of the composite-material tube 7. As shown in the figure, a bonded region A where the upper end of the composite-material tube 7 is fixed to the face plates 19 by an adhesive 21 is formed in a region corresponding to one portion at the upper end of the composite-material tube 7. Preferably, for example, an epoxy adhesive film is used as the adhesive 21.

On the other hand, below the bonded region A (on the underfloor outer board side), i.e., in the region corresponding to the remaining portion of the composite-material tube 7, a non-bonded region B where a release film (a release agent) 23 prevents the remaining portion of the composite-material tube 7 from being bonded to the face plates 19 is formed. As will be described below, the release film 23 also prevents the remaining portion of the composite-material tube 7 from being bonded to the adjacent core members 17.

As has been described, the composite-material tubes 7 are attached to the face plates 19 and the core members 17 only at one portion at the upper ends, and the other remaining portions are not bonded to the face plates 19 or the core members 17 so as to be capable of relative movement.

A material that can prevent the composite-material tubes 7 from being bonded to the face plates 19 and the core members 17 by an adhesive is used as the release film 23; for example, an FEP (tetrafluoroethylene-hexafluoropropylene copolymer (4.6 fluoride)) film is preferably used. The FEP film is available from RICHMOND CORPORATION, under the trade name A5000 WHITE.

The bonded region A can be defined as follows.

Because the composite-material tube 7 is tubular, the fragments enter an inside 7c of the tube when the composite material is fractured. The fragments accumulated in the inside 7c of the tube clog the tube, increasing the rigidity, which inhibits compressive deformation in this region. In other words, the region where the fragments enter the inside 7c of the tube and inhibit the compressive deformation does not contribute to the progressive failure. Therefore, the bonded region A is preferably provided in a region where the fragments enter the inside 7c of the tube and inhibit the compressive deformation when failure occurs (a region not contributing to the progressive failure). This can increase the displacement during the progressive failure as much as possible.

Figure 4:
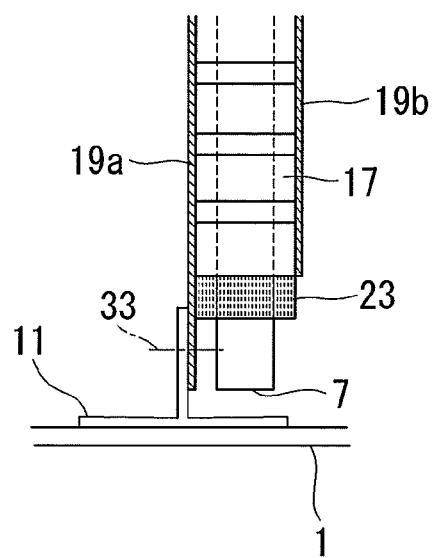
FIG. 4 is a longitudinal sectional view showing a relevant part at the lower end of the impact-absorbing structure in FIG. 2.

FIG. 4 shows a longitudinal sectional view of the lower end of the sandwich panel 9 and the vicinity thereof.

As shown in the figure, the lower end of the composite-material tube 7 is separated from the underfloor outer board 1 and the T-shaped rail. The sandwich panel 9 is connected to the T-shaped rail 11 at a fixing position 33, only through one face plate 19a with fixing means such as a bolt.

Another face plate 19b is shorter at the lower end than the one face plate 19a. Therefore, a part of the lower end of the composite-material tube 7 is exposed without being covered by the other face plate 19b. In this manner, by not covering the lower end of the composite-material tube 7 with the other face plate 19b in order not to close the space where the composite-material tube 7 is disposed, the face plates are prevented from inhibiting the progressive failure of the composite-material tubes 7.

Figure 5:
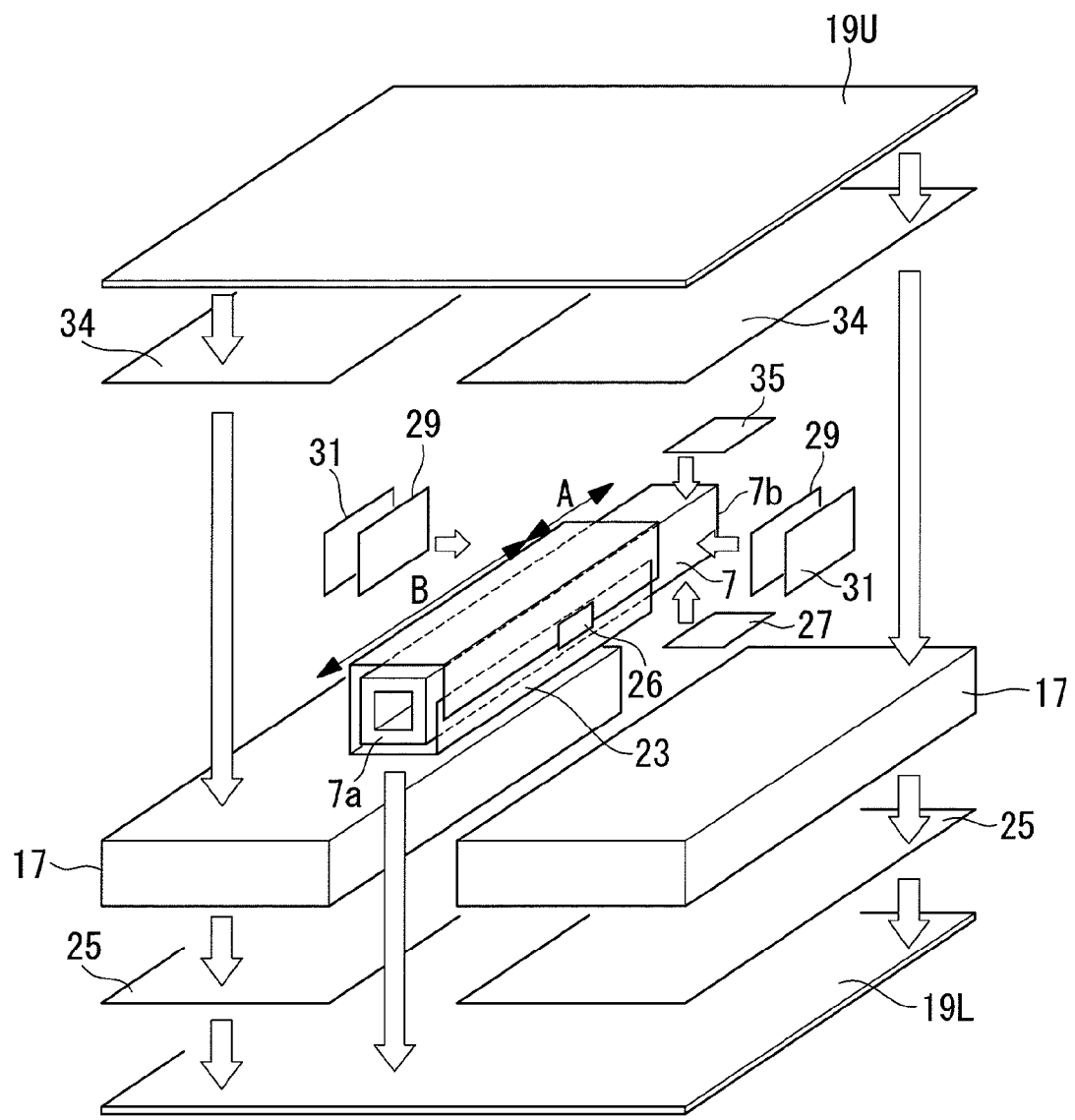
FIG. 5 is an exploded perspective view showing a method for producing a sandwich panel.

Next, using FIG. 5, a method for producing the sandwich panel 9 will be described.

First, a plurality of core members 17 are arranged on a face plate 19L positioned on the lower side. Adhesive films 25 having shapes corresponding to the core members 17 are inserted between the face plate 19L and the core members 17.

The release film 23 is wound around the composite-material tube 7 so as to cover the outer periphery thereof, and the release film 23 is fixed by a tape (for example, a PTFE tape) 26. The release film 23 is disposed from one end 7a of the composite-material tube 7 to an intermediate position that is forward of the other end 7b. The region where the release film 23 is provided constitutes the non-bonded region B. Accordingly, the region of the portion at the other end 7b, where the release film 23 is not provided, constitutes the bonded region A.

The composite-material tube 7, around which the release film 23 is wound as described above, is arranged adjacent to the core members 17 and the adhesive films 25. At this time, an adhesive film 27 is disposed between the face plate 19L and the lower surface of the bonded region A of the composite-material tube 7. Between each of the side surfaces of the bonded region A of the composite-material tube 7 and the core member 17, an adhesive film 29 and a foam adhesive 31 are arranged in sequence from the composite-material tube 7 side. An epoxy foam adhesive is preferably used as the foam adhesive 31.

Then, adhesive films 34 having shapes corresponding to the core members 17 are disposed on the top surfaces of the core members 17, an adhesive film 35 is disposed on the top surface of the bonded region A of the composite-material tube 7, and then, a face plate 19U is placed thereon from above.

These members arranged as described above are heated and pressed into a single member to form the sandwich panel 9.

As shown in FIG. 2, the sandwich panel 9 is fixed at the bottom to the underfloor outer board 1 through the T-shaped rail 11 and is fixed at the top to the upper structural member 15 through the two L-shaped rails 13.

Figure 6:
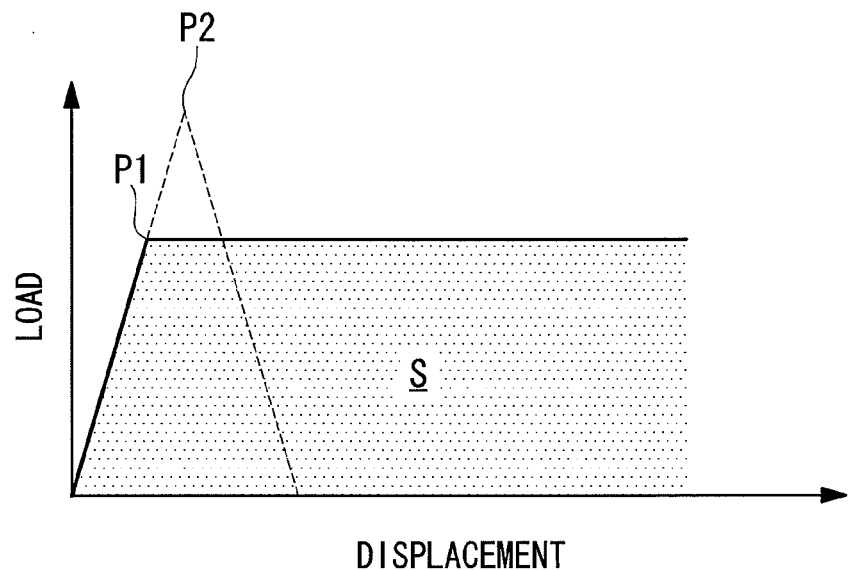
FIG. 6 is a graph showing an impact absorbing process at the time of application of an impact load.
Figure 7:
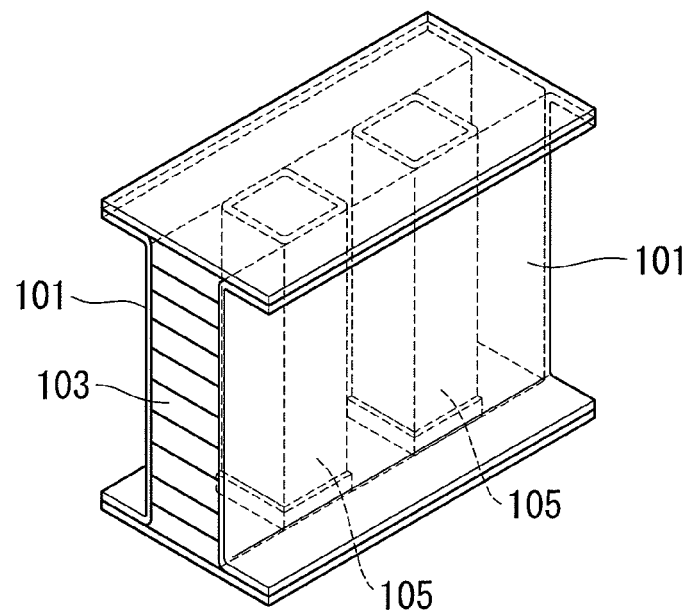
FIG. 7 is a perspective view showing a conventional impact-absorbing structure.

Next, using FIG. 6, an impact absorbing process of application of an impact load will be described. In the figure, the horizontal axis indicates the displacement, and, more specifically, it indicates the compressive displacement of the composite-material tubes 7 in the axial direction. The vertical axis indicates the load applied to the impact-absorbing structure.

As shown in the figure, when an impact load is applied, the load rises sharply (see point P1). Then, the non-bonded region B of the composite-material tube 7 fractures progressively from the end at the underfloor outer board, gradually increasing the displacement while being subjected to a predetermined load. The increasing displacement while being subjected to a predetermined load continues until the progressive failure propagates across the entire region of the non-bonded region B of the composite-material tube. Because the amount of impact energy absorbed is proportional to the area S in the figure, the larger the displacement caused by the progressive failure, the larger the amount of energy absorbed. In the composite-material tube 7 according to this embodiment, because the displacement during the progressive failure is increased by the non-bonded region B, a large amount of energy can be absorbed.

In contrast, as in the case of the related art, if the entire region of the composite-material tube is bonded to the face plates without providing a non-bonded region, the face plates restrain the composite-material tube, preventing the progressive failure from propagating effectively. This phenomenon is indicated by the broken line in the figure. That is, when an impact load is applied, the impact load rises significantly (see point P2) because the progressive failure does not immediately propagate. Then, the progressive failure does not effectively propagate because the composite-material tube is restrained by the face plates. This causes buckling failure subsequent to the failure of the face plates and results in total failure. Thus, almost no load is supported. As has been described, with the composite-material tube with the entire region fixed to the face plates without providing a non-bonded region, only a small area can be obtained in the figure. Thus, it is impossible to absorb a large impact energy.

This embodiment provides the following advantages.

One portion (bonded region A) of the composite-material tube 7 is fixed to the face plates 19, and the remaining portion (non-bonded region B) can be moved relative to the face plates 19. This allows the progressive failure of the composite-material tube 7 to propagate without being impeded by the face plates 19. Thus, because the composite-material tube 7 can assuredly fracture progressively at the remaining portion capable of relative movement, progressive failure with a large displacement occurs. Thus, the impact energy is effectively absorbed.

Furthermore, because the composite-material tube 7 is tubular, the progressive failure can be allowed to appropriately propagate without causing buckling failure.

Furthermore, because the adhesive films 27, 29, and 35 are used in one portion (bonded region A) of the composite-material tube 7, and the release film 23 is used in the remaining portion (non-bonded region B) of the impact-absorbing member, it is easy to produce a structure in which the one portion is fixed to the face plates 19 and the remaining portion is capable of movement relative to the face plates 19.

Although an application of the impact-absorbing structure to the underfloor structure of a helicopter has been described in this embodiment, the present invention is not limited thereto, and it can be applied to, for example, fixed wing aircraft and cars.

Although the release film 23 is used as the release material in this embodiment, the present invention is not limited thereto. As long as the composite-material tube 7 is prevented from being bonded or joined to the adjacent members (the face plates 19 and the core members 17), application of a release lubricant is also possible.

Although the preferred cross section of the composite-material tube 7 is rectangular as in this embodiment, it may be another shape, for example, a circular shape or a polygonal shape having five or more sides. In addition, as long as the shape allows progressive failure to occur without causing buckling, the cross section may be partially cut out (for example, C-shaped), and the cross section is not limited to an endless shape.

What is claimed is:

1. An impact-absorbing structure, comprising:
  a pair of planar face plates arranged to oppose each other with a predetermined distance therebetween;
  a core member arranged between the face plates and fixed to the face plates; and
  an impact-absorbing member arranged between the face plates adjacent to the core member, the impact-absorbing member extending in a longitudinal direction and being configured to fracture progressively due to an impact compression force acting in the longitudinal direction,
  wherein the impact-absorbing member is a tube extending in the longitudinal direction, and a first portion of the tube is fixed to the face plates with an adhesive, and a second portion of the tube is capable of moving relative to the face plates, the second portion being prevented from being bonded to the face plates,
  wherein the tube has a first end and a second end, the first portion spans from the first end of the tube to an interior end of the second portion, the second portion spans from an interior end of the first portion to the second end of the tube, and the second portion of the tube is an area in which progressive failure propagates when the impact compression force is applied,
  wherein a length of the first portion is shorter than a length of the second portion, and
  wherein the first portion of the tube is configured so as to have a length of 15 to 30% of an overall length of the tube before the impact compression force is applied.

2. The impact-absorbing structure according to claim 1, wherein the tube is formed of a composite material including a resin and reinforcing fibers.

3. The impact-absorbing structure according to claim 1, wherein a release agent that prevents the tube from being bonded to the face plates is disposed between the second portion of the tube and the face plates.

4. The impact-absorbing structure according to claim 3, wherein the release agent chemically prevents the second portion of the tube from being bonded to the face plates.

5. The impact-absorbing structure according to claim 1, wherein one face plate of the pair of face plates is disposed so as to expose one end of the second portion of the tube.

6. The impact-absorbing structure according to claim 1, wherein the face plates, the core member, and the tube are coextensive in length.

7. The impact-absorbing structure according to claim 1, wherein the face plates, the core member, and the tube are disposed between an upper structural member and a lower structural member.

8. The impact-absorbing structure according to claim 7, wherein the upper structural member is parallel to the lower structural member; and the face plates, the core member, and the tube are perpendicular to the upper structural member and the lower structural member.

9. A method for producing an impact-absorbing structure including a pair of planar face plates arranged to oppose each other with a predetermined distance therebetween; a core member arranged between the face plates and fixed to the face plates; and an impact-absorbing member arranged between the face plates adjacent to the core member, the impact-absorbing member extending in a longitudinal direction and capable of fracturing progressively due to an impact compression force acting in the longitudinal direction, wherein the impact-absorbing member is a tube extending in the longitudinal direction, the method comprising:

fixing a first portion of the tube to the face plates with an adhesive;

arranging a release agent, which prevents a second portion of the tube from being bonded to the face plates, between a the second portion of the tube and the face plates so as to enable the second portion to move relative to the face plates and enable the second portion to be an area in which progressive failure propagates when the impact compression force is applied, wherein the tube has a first end and a second end, the first portion spans from the first end of the tube to an interior end of the second portion, the second portion spans from an interior end of the first portion to the second end of the tube, and a length of the first portion is shorter than a length of the second portion; and configuring the first portion of the tube so as to have a length of 15 to 30% of an overall length of the tube before the impact compression force is applied.

10. The method for producing an impact-absorbing structure according to claim 9, wherein the release agent chemically prevents the second portion of the tube from being bonded to the face plates.

11. The impact-absorbing structure according to claim 9, wherein the face plates, the core member, and the tube are coextensive in length.

12. The impact-absorbing structure according to claim 9, wherein the face plates, the core member, and the tube are disposed between an upper structural member and a lower structural member.

13. The impact-absorbing structure according to claim 12, wherein the upper structural member is parallel to the lower structural member; and the face plates, the core member, and the tube are perpendicular to the upper structural member and the lower structural member.

* * * * *